United States Patent [19]

Winning

[11] 4,389,911
[45] Jun. 28, 1983

[54] CIRCULAR SAW SHARPENING ATTACHMENT

[76] Inventor: John K. Winning, 152 -1133 Pipeline Rd., Port Coquitlam, British Columbia, Canada

[21] Appl. No.: 205,213

[22] Filed: Nov. 10, 1980

[51] Int. Cl.³ ............................................. B23D 63/14
[52] U.S. Cl. .......................................... 76/74; 76/43; 83/704; 83/705
[58] Field of Search .................... 76/37, 79, 40, 41, 42, 76/43, 78 R, 74; 83/704, 705, 733

[56] References Cited

U.S. PATENT DOCUMENTS

| | | | |
|---|---|---|---|
| 2,293,231 | 8/1942 | Weiland | 76/43 |
| 2,574,499 | 11/1951 | Ruscitti | 76/41 |
| 3,766,806 | 10/1973 | Benner | 76/37 |
| 3,815,446 | 6/1974 | Murphy | 76/43 |
| 4,262,558 | 4/1981 | Long | 76/37 |

*Primary Examiner*—Roscoe V. Parker
*Attorney, Agent, or Firm*—Fetherstonhaugh & Co.

[57] ABSTRACT

A holder for a circular saw blade to permit sharpening of the blade on a sharpener. The holder comprises a bed to receive the saw blade. The blade can be positioned on the bed. There is a slot in the bed and a table. A further slot is formed in the table. A bolt or the like extends through the slots to releasably attach the table and the bed to allow pivoting of the bed relative to the table. The angle of presentation of the blade on the holder to the sharpener is controlled. The holder is simple to operate and easily adjusted.

9 Claims, 9 Drawing Figures

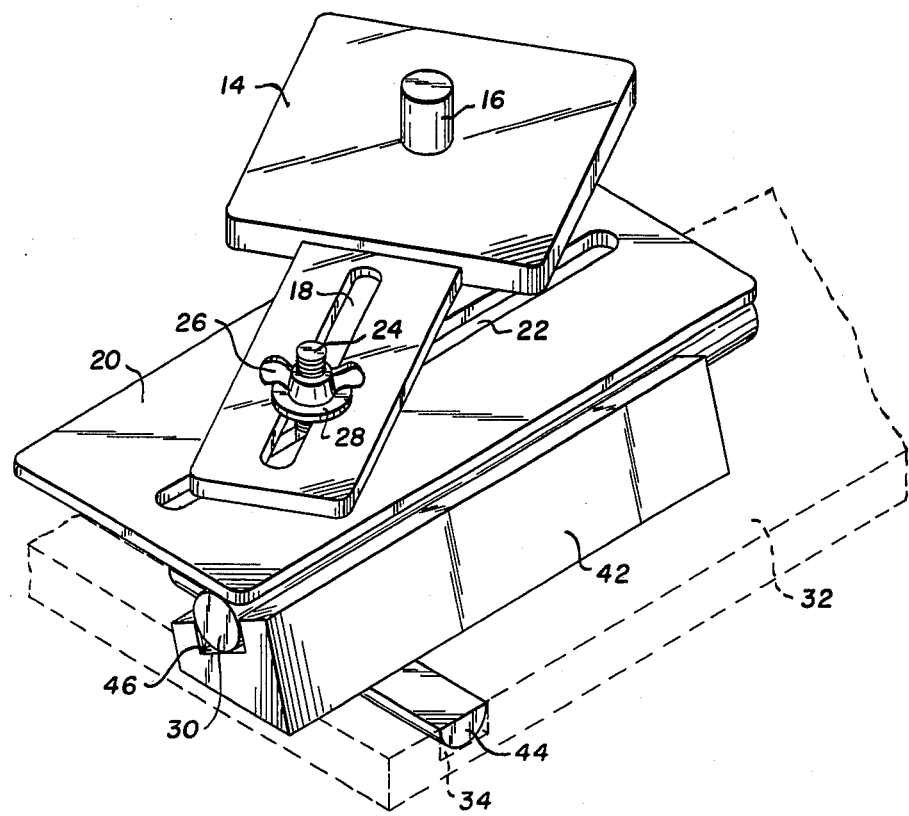

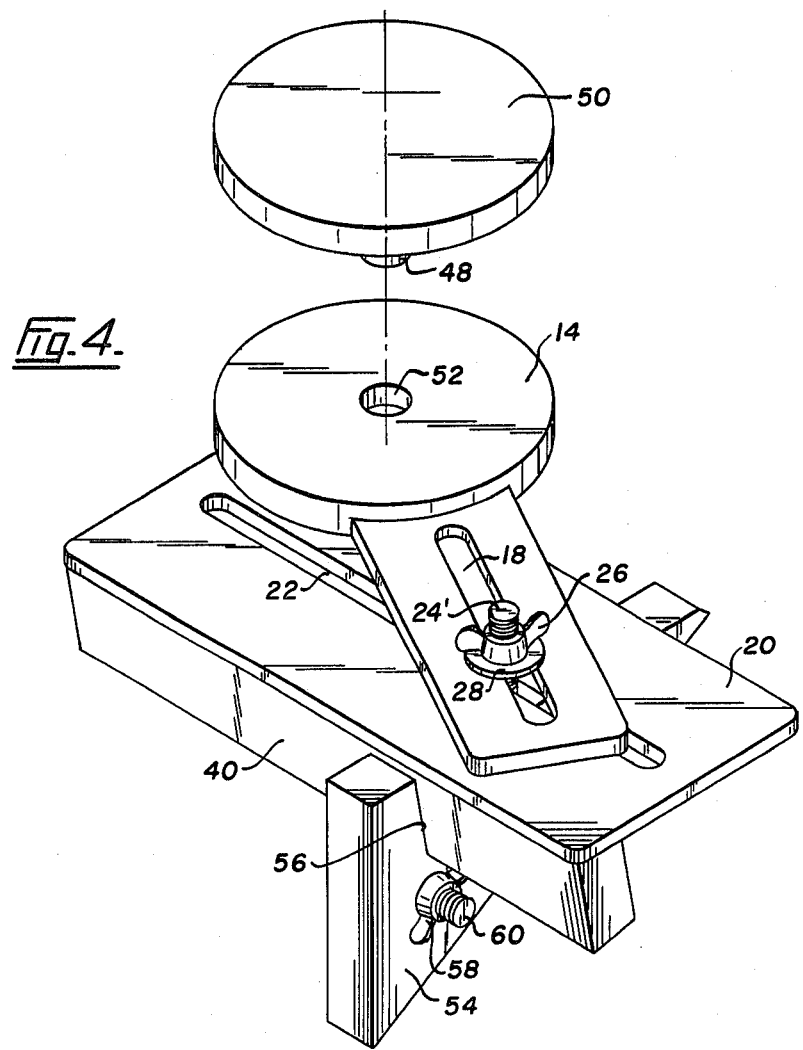
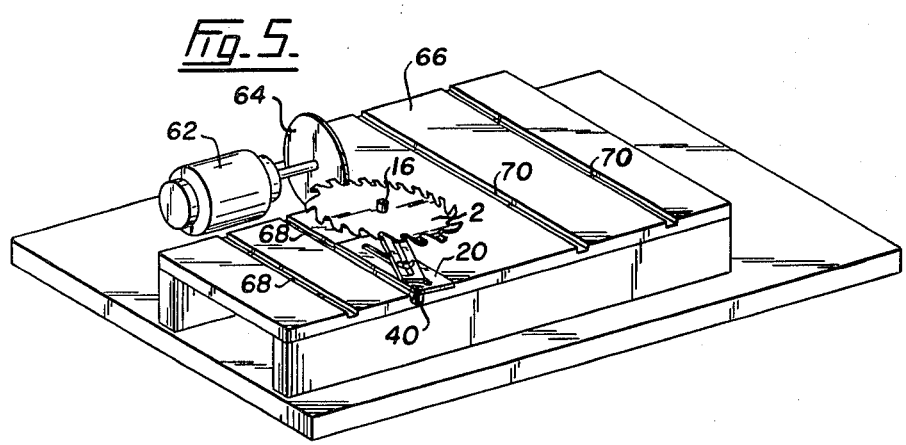

CIRCULAR SAW SHARPENING ATTACHMENT

FIELD OF THE INVENTION

This invention relates to a holder for a circular saw blade to permit sharpening of a blade on a sharpener, for example a grinding wheel or other abrasive material.

DESCRIPTION OF THE PRIOR ART

Apparatus for facilitating the presentation of a circular saw blade to a sharpener are well known. It is important that the blade be presented at the correct angle so that the teeth be sharpened to the correct angle and, usually in a subsequent operation, the clearance or shoulder angle be properly set.

Such devices exist but, previously, have involved the use of a wrench to loosen and tighten a series of set screws to set the cutting and clearance angles.

SUMMARY OF THE INVENTION

The present invention seeks to provide a holder for a circular saw blade that greatly facilitates the sharpening of a saw blade, is easy to use and provides excellent results.

Accordingly, the present invention is a holder for a circular saw blade to permit sharpening of the blade on a sharpener, the holder comprising: a bed to receive the saw blade; means to position the blade on the bed; a first slot in the bed; a table; a second slot in the table; means extending through the first and second slots to releasably attach the table and the bed to allow pivoting of the bed relative to the table; and means to control the angle of presentation of the blade on the holder to the sharpener.

BRIEF DESCRIPTION OF THE DRAWINGS

Aspects of the invention are illustrated, merely by way of example, in the accompanying drawings in which:

FIG. 3 is a perspective view of a third embodiment according to the present invention;

FIG. 4 is a perspective view of a fourth embodiment according to the present invention;

FIG. 5 illustrates use of the present invention in one mode; and

DESCRIPTION OF THE PREFERRED EMBODIMENTS

Figure 6A:
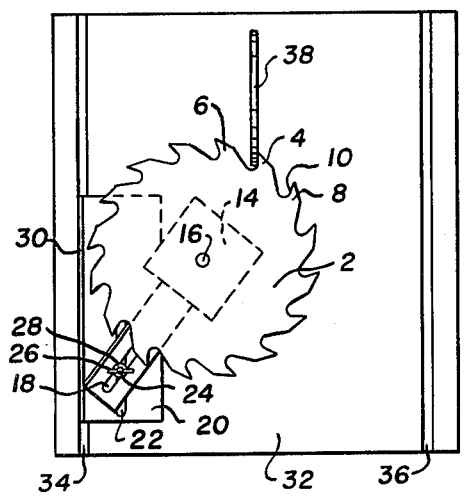
FIGS. 6A through 6D illustrate a complete sharpening operation using a holder of the present invention.
Figure 6B:
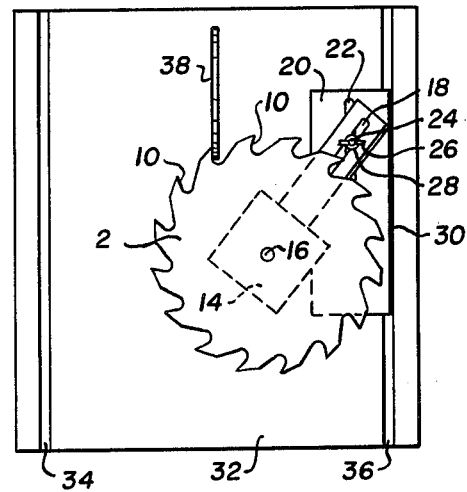
Figure 6C:
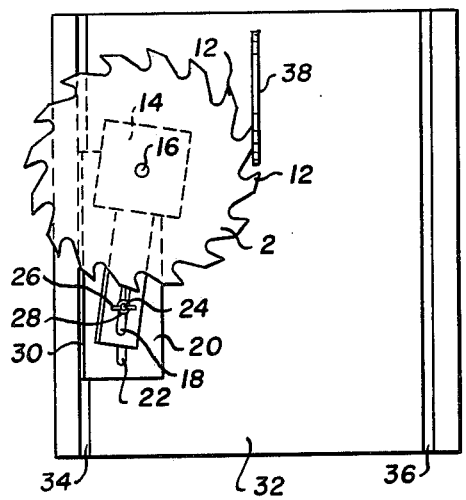
Figure 6D:
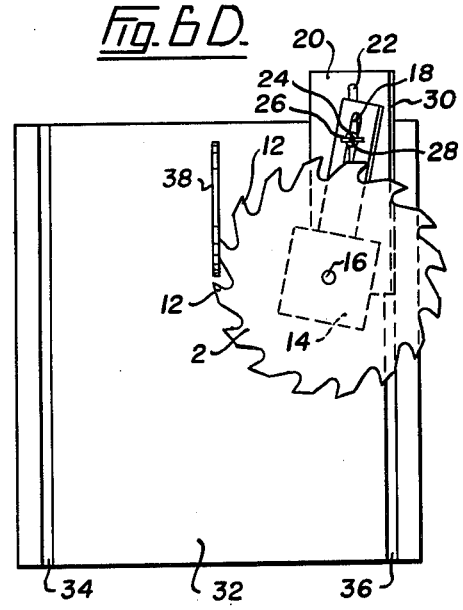

Referring to the drawings, FIGS. 6A–6D illustrates a circular blade 2 that is completely conventional. In most circular saw blades, as with most other saw blades, the teeth project alternately from, as shown in FIGS. 6A to 6D, the plane of the paper. Thus, the first tooth 4 shown in FIG. 6A will have its tip projecting upwardly from the plane of the paper. Both the neighbouring teeth 6 and 8 will then have their tips extending downwardly, through the plane of the paper. That is, the arrangement is such that a first set of alternate teeth extend upwardly from the plane of the paper and a second set of alternate teeth extend downwardly through the plane of the paper. FIGS. 6A and 6B illustrate the sharpening of the leading edges 10 of the teeth and FIGS. 6C and 6D illustrate the sharpening or rendering of the clearance of the shoulder angle 12. The leading edges and the shoulders are usually inclined to the plane of the blade by an angle of about 15°, the angle being the same on alternate teeth. However, certain fine teeth, for example for use on panelling and plywood, are so called chisel teeth. That is the leading edges are all generally perpendicular to the plane of the blade.

Figure 1:
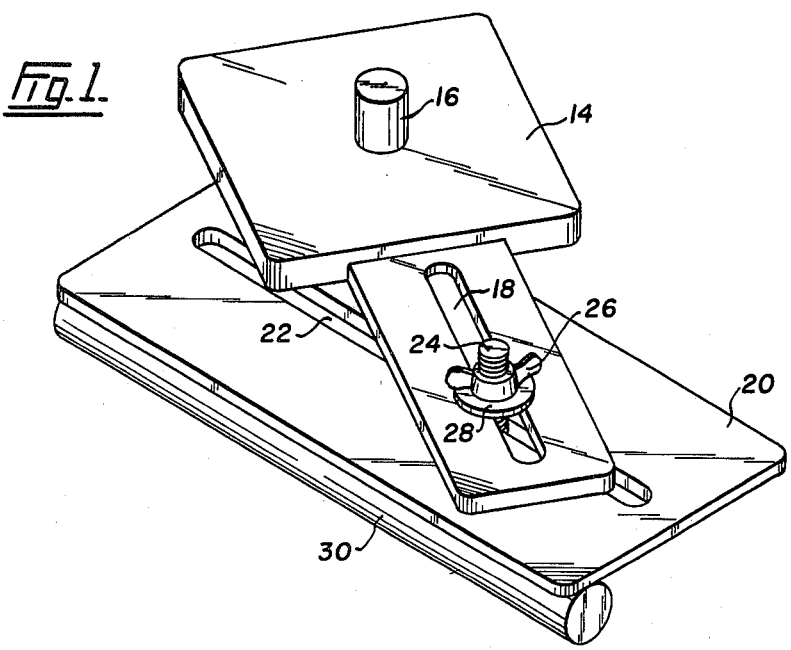
FIG. 1 is a perspective view of a first embodiment according to the present invention.

Referring to the embodiments of the invention, FIG. 1 illustrates a holder for a circular saw blade to permit sharpening of the blade on a sharpener, not shown until FIGS. 5 and 6. The device comprises a bed 14 to receive the saw blade. There are means to position the blade on the bed 14. In the embodiment of FIG. 1 the means comprises a spigot 16 extending upwardly from the bed 14 to receive the central hole present in all circular saw blades. The bed 14 is formed with a first slot 18. There is a table 20 formed with a second slot 22. In the embodiment of FIG. 1 a bolt 24 extends upwardly through the second slot 22, through the first slot 18 to engage a wing nut 26. A washer 28 is provided. Bolt 24 preferably has a square cross-section adjacent its head to prevent its rotation in slot 22.

The apparatus of FIG. 1 has a dowel 30 attached to one under edge of the table 20. The dowel 30 is a means of allowing one apparatus to be used on varying widths of locating slots in a saw table. Typically the slots in saw tables are of ⅝" or ¾" width. The angle of presentation of the blade to the sharpener, typically about 15°, is controlled by allowing the inside edge of table 20, i.e. the edge remote from dowel 30, to rest on a surface.

Use of the apparatus of FIG. 1 will be described with a regard to FIGS. 6A through 6D.

These Figures illustrate the sharpening of a blade 2 on a saw table 32 having longitudinal slots 34 and 36 formed adjacent each side. There is a grinding wheel 38 or the like sharpening member protruding through the saw table 32. The saw table 32 is shown somewhat diagrammatically as it is a well known apparatus.

Referring to FIG. 6A first the nut 26 is loosened and the blade 2 positioned on the table 20. A preliminary adjustment may be made with the wheel 38 still to ensure that the leading edges 10 of the blade 2 are presented properly to the wheel 38. In this regard it will be appreciated that the arcuate lower surface of the dowel 30 can rotate or pivot on the upper edges of the slots 34 and 36, for example if slots 34 and 36 are ⅝" wide and the dowel ¾" in diameter, or can rest on the base of the slots if the slots are ¾" wide and the dowel of the same diameter. It will also be appreciated that the distance of the wheel 38 from each slot 34 and 36 is the same and is fixed so that by adjustment of the wing nut 26 to tighten and fix the relative positions of the bed 14 and the table 20 the presentation of the saw blade 2 to the wheel 38 can be fixed. The angle of presentation is controlled by allowing the under edge of table 20, remote from dowel 30, to rest on saw table 32. The table 20 must be sufficiently thick or the bed 14 sufficiently high above table 20 to permit this witout the blade or table 14 contacting saw table 32.

Once a preliminary adjustment has been made the wing nut 26 is properly tightened, and the apparatus is withdrawn from the wheel 38 by sliding it back along the slot 34. The wheel 38 is started and the blade 2 then advanced to the position shown in FIG. 6A, that is a leading edge 10 of one tooth is sharpened, as indicated above, at the desired angle. Once the appropriate sharpening of the one tooth has been carried out, the holder, including of course the blade 2, is withdrawn and the leading edge 10 of the alternate tooth is then sharpened in the same manner. This is continued until all the alternate teeth have been sharpened at the required angle.

At that stage the blade 2 is turned over on the bed 14 and the holder moved to the other slot 36 on the saw table 32. As the slot 36 is the same distance from the wheel as the slot 34 and as the bed 14 is at the same relative position to the table 20 as shown in FIG. 6A the sharpening angle for the second set of leading edges 10 is ensured. The procedure as described in FIG. 6A is repeated. That is the leading edge 10 of every alternate tooth is sharpened as shown in FIG. 6B.

FIG. 6C illustrates the rendering of the top cutting, or shoulder, clearance of the blade 2. Again the blade is turned over from the FIG. 6B position so that the side that was upward in FIG. 6A is again upward. The bed 14 is pivoted relative to the table 20 until the blade contacts the sharpener as shown in FIG. 6C. The wing nut 26 is then locked in position and the alternate shoulders are treated as shown in FIG. 6C.

When all the alternate shoulders have been treated as in FIG. 6C the holder is removed from the slot 34, the blade 2 is turned over on the bed 14 and the apparatus moved to slot 36 as shown in FIG. 6D. The shoulders 12 not treated in FIG. 6C, which again will be alternate shoulders, are then treated as in FIG. 6D so that the proper shoulder clearance or top cutting angle is established.

Figure 2:
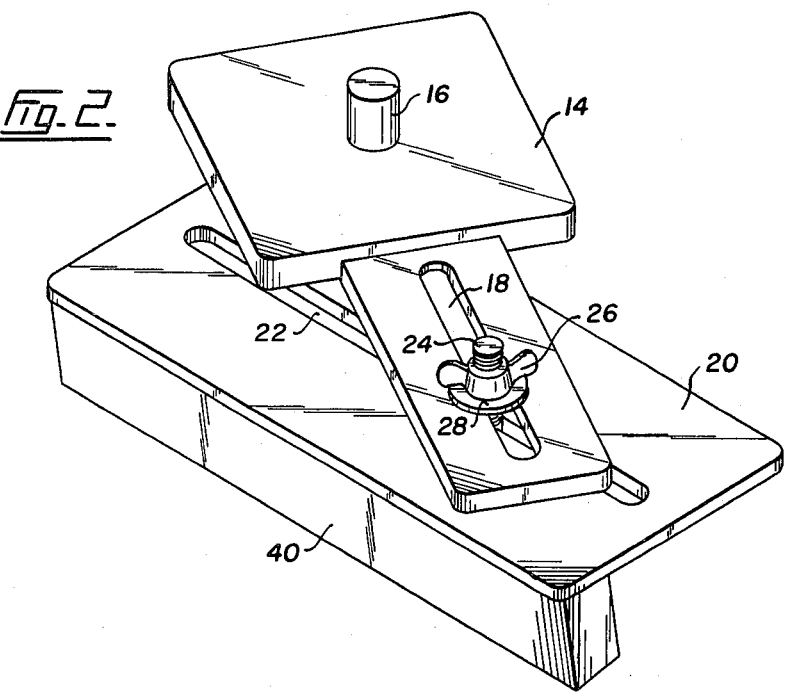
FIG. 2 is a perspective view of a second embodiment of the present invention.

FIG. 2 illustrates a further embodiment of the invention different from the embodiment of FIG. 1 by the replacement of dowel 30 by a generally rectangular member 40. However, the upper surface of the member 40, adjacent the table 20, is inclined at a required, predetermined angle. That angle is the angle to be used in sharpening the leading edges 10 of the teeth and rendering the shoulder clearances 12. It will be noted that in the FIG. 2 embodiment the angles are determined by the inclination of the table 20 to the horizontal, which inclination is fixed by the upper edge of the member 40.

The FIG. 2 embodiment is used precisely as shown in FIGS. 6A to 6D except that the member 40 fits within the slots 34 and 36 on the saw table 32, it cannot ride on the upper edges of the slots 34 and 36 but fits against the base. Lateral movement of the table 20 is prevented by abutment of the sides of the member 40 against the sides of the slots 34 and 36.

FIG. 3 illustrates a modification of the invention that is particularly useful in the sharpening of blades having a large number of fine teeth. For example in blades useful in cutting plywood or panelling very fine teeth are normally used to avoid damage to the edge of the ply or the panelling. Such teeth are typically about 1/16th inch in height and there may be 150 teeth around the circumference of a fairly small blade, for example 6 inches in diameter. Such teeth are often chisel faced, that is the leading edges are substantially perpendicular to the plane of the face of the blade.

If one sharpens such teeth on a sharpening wheel mounted on a saw table in place of the conventional circular saw blade the problem is that the sharpening wheel contacts and damages the gullet, or valley between the blades, before the proper sharpening contact can be made with the leading edges 10. This is because only a small portion of the sharpening member can protrude on a saw table because the arbor that locates the sharpening member is positioned beneath the saw table and does not permit the wheel to project far above the surface of the table. It should, in this regard, be remembered that with a table saw it is not normally necessary for the blade to project much above the surface as a deep cut is not normally required using such a saw. However, it is clear that the optimum angle of presentation of the teeth to the sharpening member with small teeth is along a diameter of the sharpening member. The FIG. 3 embodiment illustrates a simple addition that can be used with the embodiment of FIG. 1 to put a chisel edge on small teeth.

The addition comprises a solid piece 42 having attached to its bottom a semi-circular dowel piece 44 whose upper surface is flush with the saw table 32. The base of the solid piece 42 thus rests on the surface of the saw table 32. It will be appreciated that this ensures that a chisel edge is put on the teeth, that is the plane of the saw blade is presented at right angles to the plane of the sharpening member. There is a channel 46 in the upper surface of the solid member. This channel 46 receives the dowel 30 of the FIG. 1 embodiment. The effect is simply to lift up the blade during sharpening to incline the blade 2 in such a way that it is presented roughly along a diameter of the sharpening member 38.

The apparatus shown in FIG. 3, which of course includes the apparatus of FIG. 1, is used by simply sliding the solid piece 42 forward so that the teeth are sharpened. It should be noted that, in general, it is not necessary to turn over the blade 2 nor to move the apparatus from slot 34 to slot 36 as all leading edges are sharpened at the same angle, that is generally perpendicular to the plane of the blade. However, a full dowel can be used in place of semi-circular dowel piece 44 and this simple modification ensures that the leading edges of the teeth can be presented to the sharpener at an angle by raising one end of the table 20 relative to the other.

To render the shoulder clearance the piece 42 is dispensed with and the FIG. 1 embodiment is used as described with regard to FIGS. 6C and 6D above.

FIG. 4 illustrates an embodiment of the invention that differs from the embodiment of FIG. 2 by the positioning of a spigot 48 on a disc 50. The bed 14 is provided with a central hole 52 to receive the spigot 48. The blade is located, during sharpening, between the bed 14 and the disc 50.

The embodiment of FIG. 4 is also useful in the sharpening of fine teeth on a sharpening member mounted on a table saw. It is not generally as convenient to use as the embodiment of FIG. 3 but is a useful embodiment of the present invention. FIG. 4 features an additional member 54 located to the holder by a stud 24' extending upwardly from the member 54 in place of bolt 24 of FIGS. 1 and 2. The member 54 is provided with a clearance slot 56 so that it may fit around the rectangular member 40.

To use the embodiment of FIG. 4 the leading edges are sharpened in a manner analogous to that described for the embodiment of FIG. 3. However, it should be remarked that the embodiment of FIG. 4 is such that when the member 54 is positioned within a slot 34 or 36 on a saw table 32 the end of the table 14 remote from the member 54 is inclined downwardly to touch the surface of saw table 32. This permits the formation of an angle on the leading edges 10 of the teeth to be sharpened. This necessitates turning over the blade and the use of both slots 34 and 36 as described for FIGS. 6A and 6B.

Thus to use the embodiment of FIG. 4, the shoulders may be sharpened by releasing the wing nut 26 and temporarily discarding the member 54. In this regard a spare nut 58 and spare bolt 60 are provided in the member 54. When the member 54 is discarded the spare nut 58 and bolt 60 are removed and used to locate the bed 14 and the table 20 precisely as described for FIGS. 1 and 2 and as illustrated generally in FIGS. 6C and 6D.

When the shoulders have been treated, as shown in FIGS. 6C and 6D, the spare bolt 60 may be stored in the member 54 which is then attached to the bed 14 and table 20 by having the stud 24' project upwardly through slots 18 and 22 to be engaged by wing nut 26. The device is then held with member 54 within a slot 34 or 36 while the leading edges are presented to the sharpener in sets of alternate teeth as shown in FIGS. 6A and 6B.

FIG. 5 is included to indicate that it is not necessary to have a proper saw table 32 to operate the device according to the present invention. FIG. 5 illustrates the use of a simple electric hand drill 62 held by means, not shown, well known in the art. A sharpening wheel 64 is attached to the hand drill 62. A table 66 having slots 68 and 70 formed in it can simply be made, for example from chipboard, plywood or the like material. That is FIG. 5 simply indicates that it is not necessary to have the relatively expensive saw table 32 to achieve good results with the holder of the present invention.

The invention provides an economical apparatus useful in sharpening saw blades. It is easy to use. Mere finger pressure on the blade is sufficient as the blade is presented to the sharpener. Further adjustments do not need any wrenches, mere finger tightening to fix the relative positions of the components is sufficient.

I claim:

1. A holder for a circular saw blade to permit sharpening of the blade on a sharpener having a sharpening surface rotatable in a fixed plane, the holder comprising:
   a bed to receive a saw blade;
   means to position the blade on the bed;
   a first slot in the bed;
   a table to support the bed and having a first surface to support the bed and a second surface, a first edge and a second edge;
   a second slot in the table;
   means extending through the first and second slots to releasably attach the table and the bed to allow pivoting of the bed relative to the table and locking of the bed and the table at a predetermined relative position;
   a projection formed on the second surface of the table, at the first edge, whereby when the holder is placed on a level surface the table inclines downwardly from the first edge to the second edge to define the angle of presentation of the blade on the holder to said fixed plane in which the sharpening surface of the sharpener is rotatable with the length of the first edge of the table being at a uniform distance from said level surface.

2. A holder as claimed in claim 1 in which the means to position the blade on the bed comprises a recess in the bed;
   a disc;
   a spigot on the disc to extend, when the holder is in use, through a central hole in the blade into the recess in the disc to locate the blade.

3. A holder as claimed in claim 1 in which the means to position the blade on the bed comprises a spigot extending from the bed to engage a central hole in the blade.

4. A holder as claimed in claim 1 in which the projection formed on the second surface of the table comprises a member having, at least in part, a circular section, to engage a slot.

5. A holder as claimed in claim 4 in which the member is a dowel.

6. A holder as claimed in claim 1 in which the projection has a first edge to abut the second surface of the table and a second edge, opposed to the first edge, and at a predetermined angle to the first edge, the predetermined angle being the angle to be used in presenting the blade to the sharpener.

7. A holder as claimed in claim 1 including a first guide removably attachable to the base of the table to extend across the table;
   the first guide having a first edge to abut the second surface of the table and a second edge, opposed to the first edge and at a predetermined angle to the first edge, the predetermined angle permitting the blade to be presented generally on a diameter of the sharpener.

8. A holder as claimed in claim 1 in combination with a second table to receive the holder and to be fixed in relation to the sharpening wheel;
   grooves in the second table generally parallel to the plane of the sharpening wheel, at least one groove on each side of the wheel, each at the same distance from the wheel and in which the projection formed on the second surface of the table, at the first edge, is a dowel able to be located in a variety of widths of said longitudinal grooves in the second table.

9. A holder as claimed in claim 8 including a control member comprising a body having a first slot in one surface to receive said dowel;
   said one surface being at an angle to the opposed surface of the control member;
   a transverse member extending across said control member on said opposed surface and adapted to engage a groove in the first table whereby the holder can be presented to the sharpener at an angle such that the blade to be sharpened is presented generally along a diameter of the sharpening wheel.

* * * * *